R. STONE.
SHOCK ABSORBER FOR AUTOMOBILES.
APPLICATION FILED FEB. 27, 1915.

1,174,197.

Patented Mar. 7, 1916.

WITNESSES:
Frank R. Glow
H. C. Rodgers

INVENTOR
Ray Stone
BY
George H. Thorpe
ATTORNEY

UNITED STATES PATENT OFFICE.

RAY STONE, OF LAREDO, MISSOURI.

SHOCK-ABSORBER FOR AUTOMOBILES.

1,174,197.     Specification of Letters Patent.     Patented Mar. 7, 1916.

Application filed February 27, 1915. Serial No. 10,940.

*To all whom it may concern:*

Be it known that I, RAY STONE, a citizen of the United States, residing at Laredo, in the county of Grundy and State of Missouri, have invented certain new and useful Improvements in Shock-Absorbers for Automobiles, of which the following is a specification.

This invention relates to shock absorbers for automobiles, and my object is to provide a construction designed especially to absorb shocks or vibrations incidental to travel on city streets, so that the body of the car shall, in effect, float, and the occupants thereof ride with the greatest possible comfort.

As well known the conventional springs on automobiles are of strength or stiffness to accommodate heavy loads and the heavy shocks incidental to travel over rough or irregular ground and therefore do not respond readily to the light shocks incidental to travel with a light load on smooth streets.

In its preferred application my improvement is used in connection with the regular springs of a car and bears such coöperative relation thereto that it shall absorb all shocks within its capacity and impose shocks beyond its capacity, upon the springs.

Figure 1:
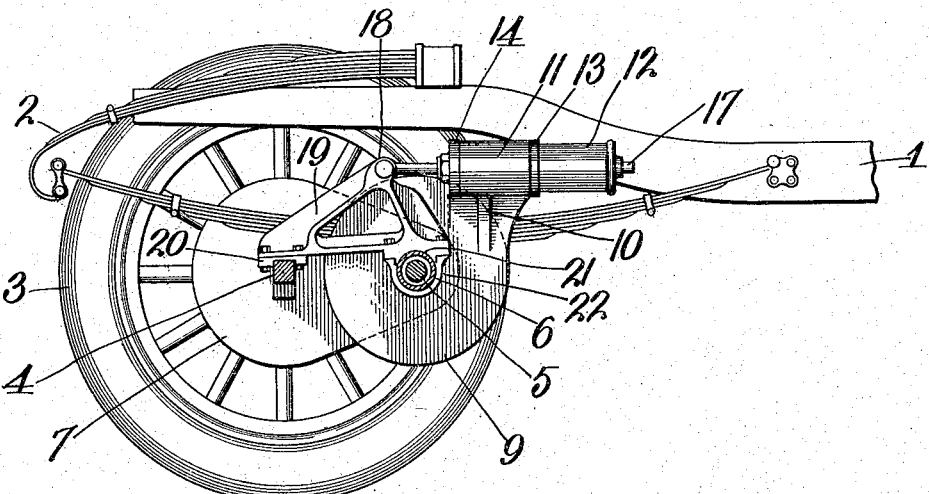
Figure 3:
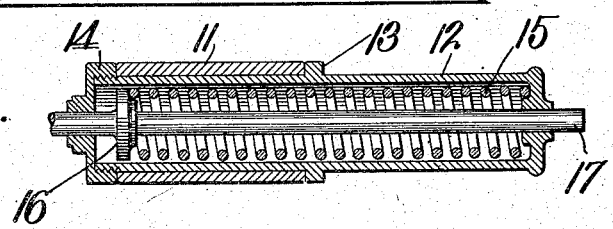
Figure 2:
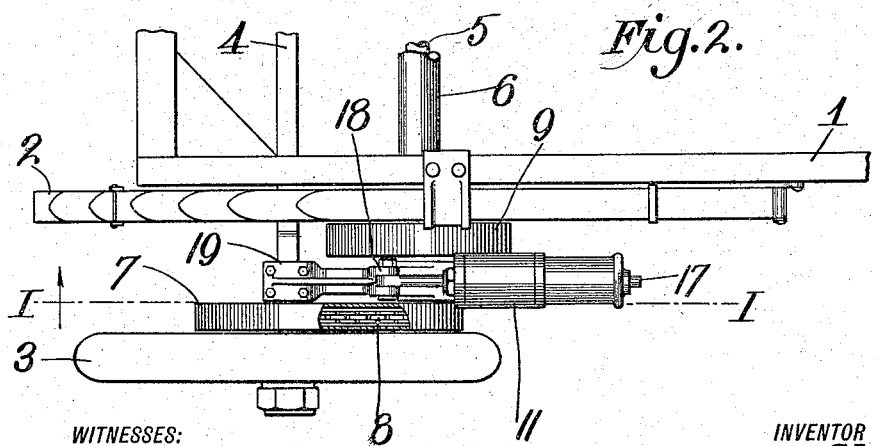

With the object mentioned in view, the invention consists in certain novel and peculiar features of construction and organization as hereinafter described and claimed, and in order that it may be fully understood, reference is to be had to the accompanying drawing in which:

Figure 1, is a view of the rear portion of an automobile, minus the body, the figure representing a section taken on the line I—I of Fig. 2. Fig. 2, is a plan view of the construction shown by Fig. 1. Fig. 3, is an enlarged section of one of the shock absorbing connections, forming a part of my improvement.

In the said drawing 1 is the chassis, 2 the rear springs and 3 the rear wheels of an automobile. 4 is an axle upon which said wheels are journaled, 5 is a transverse drive shaft adapted to be driven from the engine in the customary manner, and to be provided with the usual differential gearing, not shown. A sheath or sleeve 6 for the drive shaft is secured in any suitable manner, not shown, to the lower parts of the spring 2, 7 a gearing housing at each end of the drive shaft and secured in any suitable manner upon the axle 4, and 8 represents a sprocket gearing for transmitting power from the drive shaft to the wheels 3, in any suitable manner.

9 are the customary brake drums at each side of the chassis and bearing a rigid relation to the sheath or sleeve 6. Preferably cast with each drum is an arm 10 terminating in a horizontally arranged cylinder 11 within which snugly fits a cylinder 12. The cylinders 12 are provided with external flanges 13 bearing against the front ends of the cylinders 11. Cylinder heads 14 are screwed upon the rear ends of cylinders 12 and bear against the rear ends of cylinders 11, and thus coöperate with flanges 13 in holding the cylinders 12 firmly in position.

15 are coiled spring cushions fitted in the cylinders 12 and bearing at their front ends against said cylinders and at their rear ends against collars 16 within the cylinders and secured in any suitable manner upon plunger rods 17 extending slidingly through the cylinders 12. The rear ends of said rods are pivoted at 18 to triangular shaped brackets 19, secured rigidly to plates 20, fastened to the rear axle 4. The front ends of the brackets below the planes of pivotal points 18 are formed with concave bearing seats 21 engaging the sheath or sleeve 6, U-shaped bearings embracing the lower side of said sheath or sleeve and bearing secured to the brackets so as to coöperate with the latter and the springs 2 in the support of the sheath or sleeve.

In the travel of a car equipped with shock absorbing appliances embodying my invention the spring cushions 15 will be of sufficient strength to carry the weight of the car when occupied but will offer less resistance to shock or jar than the main springs 2. Because of this the usual or slight upward movement of the wheels, incident to travel over irregularities in the surface of a roadway are absorbed by the said spring cushions, as in such movements of the wheels the driving shaft 5 constitutes the axis of movement of the brackets and the latter therefore cause the collars 16 to move forward in cylinders 12 and compress the spring cushions therein.

In the event the car is subjected to excessive shock or jar, as when passing rapidly over a gutter or a substantial hump of the roadway, the spring cushions 15 will be compressed as before, as explained, but their resistance will gradually increase until it exceeds that offered by the main or supporting springs. When this occurs the last-named springs will yield in the usual manner.

It is obvious that if the main springs be omitted and the cushion-extending cylinders be secured to the chassis, the springs 15 will absorb the heavy as well as the light shocks—in other words, will perform the same function as the main springs when used alone. The construction shown is preferred however, as it not only requires less modification or change from conventional design of automobiles but insures a smoother and easier running action of the car.

While the drawing illustrates the application of my improved shock absorber to the rear end of the car, it is obvious that with slight modification it could also be employed at the front end of a car.

From the above description it will be apparent that I have produced a shock absorber for automobiles which embodies the features of advantage enumerated as desirable and which may be modified structurally without departing from the principle of construction involved.

I claim:

1. The combination in an automobile, of the chassis, an axle, supporting wheels mounted thereon, springs carried by the chassis and adapted for the support of a car body, a drive shaft supported from the springs for operating the wheels, brackets mounted upon the axle and bearing a journaled relation to the drive shaft, cushions secured in fixed relation to the drive shaft, and means whereby slight relative vertical movement between the chassis and axle shall effect compression of the cushions; excessive relative movements between the axle and chassis being transmitted to the springs.

2. The combination in an automobile, of the main springs, an axle, wheels journaled thereon, a pair of longitudinally extending cylinders suitably supported from said springs, spring cushions within said cylinders, rods extending through said cylinders and provided with collars engaging the springs, a drive shaft supported from the said springs, a sheath or sleeve inclosing the drive shaft, means for transmitting power from the drive shaft to the rear wheels, and a pair of brackets bearing a journaled relation at their opposite ends to said sheath or sleeve and axle and pivoted to the rear ends of said rods.

In testimony whereof, I affix my signature, in the presence of two witnesses.

RAY STONE.

Witnesses:
H. C. RODGERS,
G. Y. THORPE.

Copies of this patent may be obtained for five cents each, by addressing the "Commissioner of Patents, Washington, D. C."